(12) United States Patent
Balevi et al.

(10) Patent No.: US 12,035,256 B2
(45) Date of Patent: Jul. 9, 2024

(54) POWER CONTROL IN OVER THE AIR AGGREGATION FOR FEDERATED LEARNING

(71) Applicant: QUALCOMM Incorporated, San Diego, CA (US)

(72) Inventors: Eren Balevi, San Diego, CA (US); Taesang Yoo, San Diego, CA (US); Tao Luo, San Diego, CA (US); Srinivas Yerramalli, San Diego, CA (US); Junyi Li, Fairless Hills, PA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/544,581

(22) Filed: Dec. 7, 2021

(65) Prior Publication Data
US 2023/0180152 A1 Jun. 8, 2023

(51) Int. Cl.
*H04W 52/50* (2009.01)
*H04W 4/06* (2009.01)
(Continued)

(52) U.S. Cl.
CPC ............ *H04W 52/50* (2013.01); *H04W 4/06* (2013.01); *H04W 52/225* (2013.01); *H04W 52/242* (2013.01); *H04W 52/36* (2013.01)

(58) Field of Classification Search
CPC ..... H04W 52/50; H04W 4/06; H04W 52/225; H04W 52/242; H04W 52/36;
(Continued)

(56) References Cited

U.S. PATENT DOCUMENTS

2021/0117780 A1* 4/2021 Malik ................. H04W 52/225
2022/0058507 A1* 2/2022 El-Khamy ............. H04L 67/10
(Continued)

OTHER PUBLICATIONS

Chen M., et al., "Distributed Learning in Wireless Networks: Recent Progress and Future Challenges", IEEE Journal on Selected Areas in Communications, IEEE Service Center, Piscataway, US, vol. 39, No. 12, Oct. 6, 2021, pp. 3579-3605, XP011888889, ISSN: 0733-8716, DOI: 10.1109/JSAC.2021.3118346 [retrieved on Nov. 18, 2021] section I.A section III.A, figure 4 section III.B.
(Continued)

*Primary Examiner* — Lana N Le
(74) *Attorney, Agent, or Firm* — QUALCOMM Incorporated

(57) ABSTRACT

A parameter server located at a base station may coordinate federated learning among multiple user equipment (UEs) using over-the-air (OTA) aggregation with power control to mitigate aggregation distortion due to amplitude misalignment. The parameter server may select a first group of UEs for a first OTA aggregation session of a federated learning round based on a common received power property of each UE in the first group of UEs. The parameter server may transmit a global model to the first group of UEs. Each UE in the first group may train the global model based on a local dataset and transmit values associated with the trained local model. The parameter server may receive, on resource elements for the first group of UEs, a first aggregate amplitude modulated analog signal representing a combined response from the first group of UEs.

28 Claims, 10 Drawing Sheets

(51) Int. Cl.
*H04W 52/22* (2009.01)
*H04W 52/24* (2009.01)
*H04W 52/36* (2009.01)

(58) Field of Classification Search
CPC ............ H04W 52/367; H04W 52/146; H04W 52/365; H04W 72/21; H04W 88/02; H04W 52/346; H04W 52/262; H04W 72/02; H04W 72/0473; G06N 3/0464; G06N 3/084; G06N 3/098; G06N 3/08; G06N 3/0985; G06N 7/005; G06N 20/00; H04L 25/03343; H04L 27/2614; H04L 67/10; H04B 1/0475
See application file for complete search history.

(56) References Cited

U.S. PATENT DOCUMENTS

| | | | |
|---|---|---|---|
| 2022/0237508 A1* | 7/2022 | Shaloudegi | G06N 20/00 |
| 2023/0102233 A1* | 3/2023 | Wang | G06N 3/098 706/12 |
| 2023/0180146 A1* | 6/2023 | Takeda | H04W 52/146 455/522 |
| 2023/0316141 A1* | 10/2023 | Toporek | G06N 3/0464 706/12 |

OTHER PUBLICATIONS

International Search Report and Written Opinion—PCT/US2022/077875—ISA/EPO—Jan. 24, 2023.

Kamel M., et al., "Uplink Coverage and Capacity Analysis of mMTC in Ultra-Dense Networks", IEEE Transactions on Vehicular Technology, IEEE, USA, vol. 69, No. 1, Nov. 16, 2019, pp. 746-759, XP011766800, ISSN: 0018-9545, DOI: 10.1109/TVT.2019.2954233 [retrieved on Jan. 16, 2020] section II.C.

Xu C., et al., "Learning Rate Optimization for Federated Learning Exploiting Over-the-Air Computation", IEEE Journal on Selected Areas in Communications, IEEE Service Center, Piscataway, US, vol. 39, No. 12, Oct. 6, 2021, pp. 3742-3756, XP011888498, ISSN: 0733-8716, DOI: 10.1109/JSAC.2021.3118402 [retrieved on Nov. 18, 2021], section II, section v.

Zhu G., et al., "Broadband Analog Aggregation for Low-Latency Federated Edge Learning", IEEE Transactions on Wireless Communications, Jan. 31, 2020, IEEE Service Center, Piscataway, NJ, US, vol. 19. No. 1, Oct. 15, 2019, pp. 1-16, XP011766445, ISSN: 1536-1276, DOI: 10.1109/TWC.2019.2946245, section I, figure 1 abstract, section I.A, section I.B, section II.A, section II.B, pp. 491-499.

* cited by examiner

POWER CONTROL IN OVER THE AIR AGGREGATION FOR FEDERATED LEARNING

BACKGROUND

Technical Field

The present disclosure relates generally to communication systems, and more particularly, to power control in over the air aggregation for federated learning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a parameter server (e.g., a base station). The method may include selecting a first group of user equipment (UEs) for a first over-the-air (OTA) aggregation session of a federated learning round based on a common received power property of each UE in the first group of UEs. The method may include transmitting a global model to the first group of UEs. The method may include receiving, on resource elements for the first group of UEs, a first aggregate amplitude modulated analog signal representing a combined response from the first group of UEs, the combined response being a sum of values associated with trained local models for an aggregation period determined at each UE based on the global model and a local dataset.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the disclosure provides a method of wireless communication for a UE. The method may include receiving a global model from a parameter server. The method may include training the global model based on training data to determine a plurality of local epochs. The method may include performing truncated channel inversion based on a power headroom and a threshold for truncated channel inversion for each of a plurality of values associated with at least a last local epoch of the plurality of local epochs. The method may include transmitting an amplitude modulated analog signal to the parameter server for each respective value of the plurality of values, wherein a transmission power of the amplitude modulated analog signal is scaled based on the respective value associated with at least the last local epoch.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
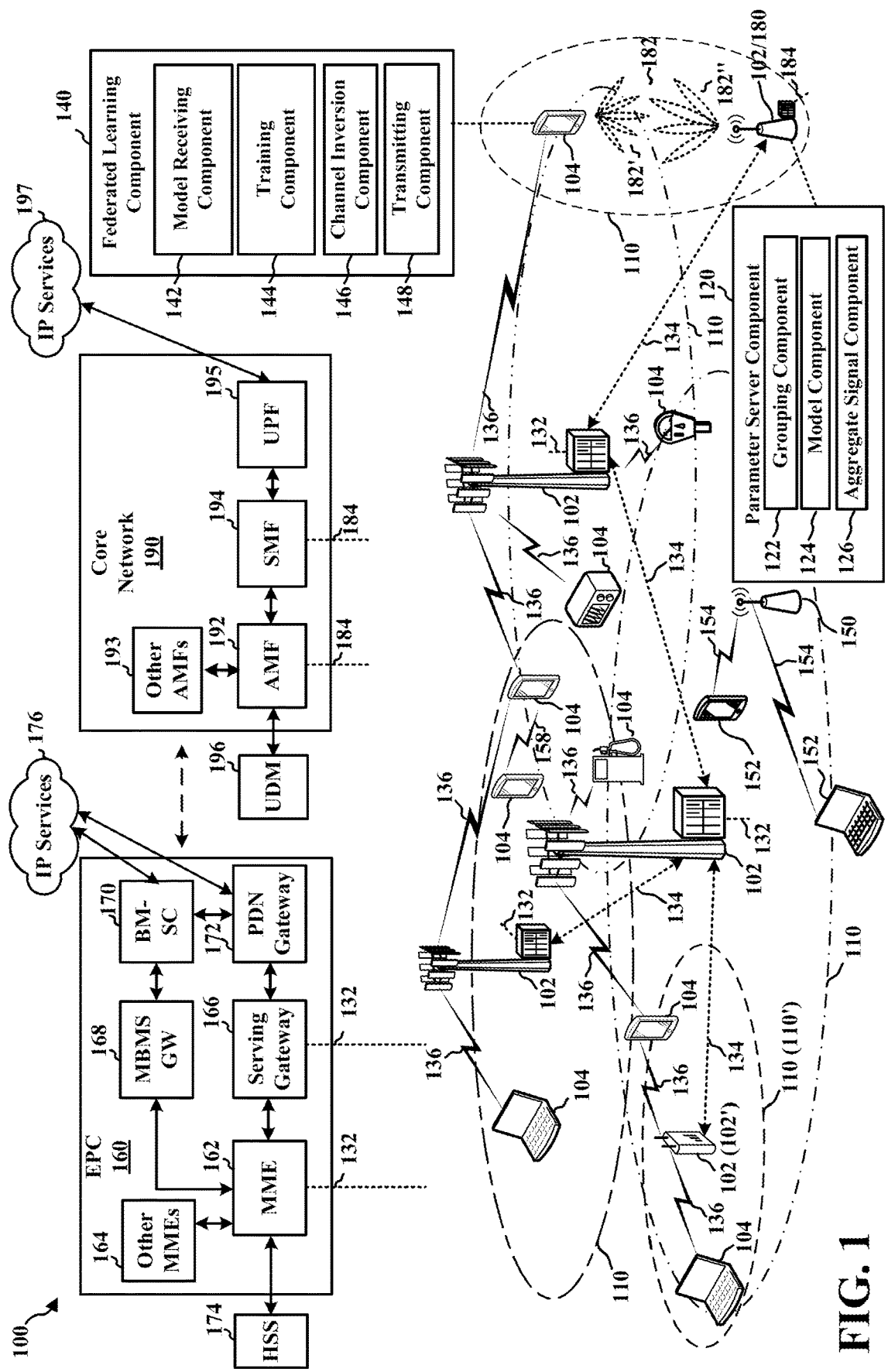
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Federated learning is a machine learning architecture in which users to train a machine-learning model in a distributed fashion using a local dataset. Federated learning has an advantage that the users are able to keep the local dataset private. Federated learning may also reduce communication costs because the local dataset is not transmitted. In an example federated learning architecture, learning occurs in multiple rounds. For each round, a parameter server selects a number of users and sends a copy of a global machine-learning model. Each user then trains the parameters of this model with its own local dataset and provides a result to the parameter server. The result may be a value associated with a local epoch at the user. For example, a local epoch may be a value of a parameter of the trained learning model or a gradient defining a change of a parameter of the trained learning model. The parameter server may aggregate all of the user results and update the global model accordingly. The parameter server may broadcast the new parameters of the global model to selected users in a next round.

Despite potential savings with respect to transmitting the local datasets, federated learning may still have significant communication costs with respect to transmitting the training results. Conventionally, each user may separately transmit the results, with the results of each user being referred to as $\theta_k$. In some implementations, Ok may be a very high-dimensional vector (e.g., millions of parameters). For example, in a wireless communication system such as an LTE or 5G NR network, each user if K users may be assigned different physical uplink shared channel (PUSCH) resources to transmit $\theta_k$. Accordingly, when there are T rounds of training, K users, and a communication cost C per round, the total cost may be represented as T.K.C.

One attractive approach to federated learning in a wireless communication environment is to utilize over-the-air (OTA) aggregation. In OTA aggregation, multiple users transmit information on the same resources and the transmitted signals are combined in a multiple access channel before being received at the parameter server. The parameter server determines an aggregated parameter value from the combined signal. For example, each transmitted signal may be an analog amplitude modulated signal such that the combined signal represents a total value transmitted by the multiple users. The aggregated parameter value may be determined, for example, by dividing the total sum (or the received combined signal) by the number of users participating in the OTA aggregation session.

Conventional OTA aggregation requires tight power control and amplitude modulation to ensure that the received signal magnitudes at the parameter server from all participating users are identical. For example, if one user were to transmit with a significantly higher power such that the received signal magnitude dominates the received signal, the signals from the other users may effectively be ignored. Such tight power control to equalize received signal magnitudes may be difficult to achieve in real world systems where users may be located at different distances to the parameter server and/or may experience different channel conditions.

The present disclosure provides techniques for power control for federated learning. In an aspect, a parameter server may be located at a base station and control transmission power of multiple user equipment (UEs) participating in the federated learning. The parameter server may select a group of UEs for a first OTA aggregation session based on a common received power property of each of the first group of UEs. For example, the first group of UEs may have a pathloss or power budget within a range. The parameter server may transmit a global model to at least the first group of UEs. The parameter server may receive a first aggregate amplitude modulated analog signal representing a combined response from the first group of UEs. For example, each UE may transmit an individual amplitude modulated analog signal representing a local epoch determined at the respective UE based on the global model and a local dataset. The UEs may transmit corresponding results on the same resource elements such that the signals are combined over-the-air. In some implementations, the parameter server may select multiple groups of UEs, and each group of UEs may transmit on different resources. The parameter server may aggregate the OTA combined responses from each group of UEs.

In another aspect, a UE participating in federated learning may perform power control. The UE may perform truncated channel inversion based on a power headroom and a threshold for truncated power inversion. For example, the power headroom may be determined based on a maximum transmission power, and the threshold may be signaled from the parameter server, calculated by the UE as a function of pathloss and a number of configured training samples, or determined based on a tradeoff between a transmit power penalty and value accuracy.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. The truncated channel inversion may truncate one or more values associated with the plurality of local epochs to meet the power headroom in response to a transmit power after channel inversion exceeding a power headroom.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the base stations 102/180 may include a parameter server component 120 configured to coordinate one or more rounds of federated learning among a plurality of UEs 104. The parameter server component 120 may include a grouping component 122 configured to select a first group of UEs for a first OTA aggregation session of a federated learning round based on a common received power property of each of the first group of UEs. The parameter server component 120 may include a model component 124 configured to transmit a global model to the first group of UEs. The parameter server component 120 may include an aggregate signal component 126 configured to receive, on specified resource elements for the first group of UEs, a first aggregate amplitude modulated analog signal representing a combined response from the first group of UEs for values trained local models for an aggregation period determined at each UE based on the global model and a local dataset.

In an aspect, as illustrated, one or more of the UEs 104 may include a federated learning component 140 configured to participate in one or more rounds of federated learning. The federated learning component 140 may include a model receiving component 142 configured to receive a global model from a parameter server. The federated learning component 140 may include a training component 144 configured to train the global model based on training data to determine a plurality of local epochs. The federated learning component 140 may include a channel inversion component 146 configured to perform truncated channel inversion based on a power headroom and a threshold for truncated channel inversion for each of a plurality of values associated with at least a last local epoch of the plurality of local epochs. The federated learning component 140 may include a transmitting component 148 configured to transmit an amplitude modulated analog signal to the parameter server for each of the plurality of values. A transmission power is scaled based on the value associated with at least the last local epoch.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 136 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 136 may use multiple-input and multiple-output (MIMO) antenna technology, including spatial multiplexing, beamforming, and/or transmit diversity. The communication links 136 may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figure 2A:
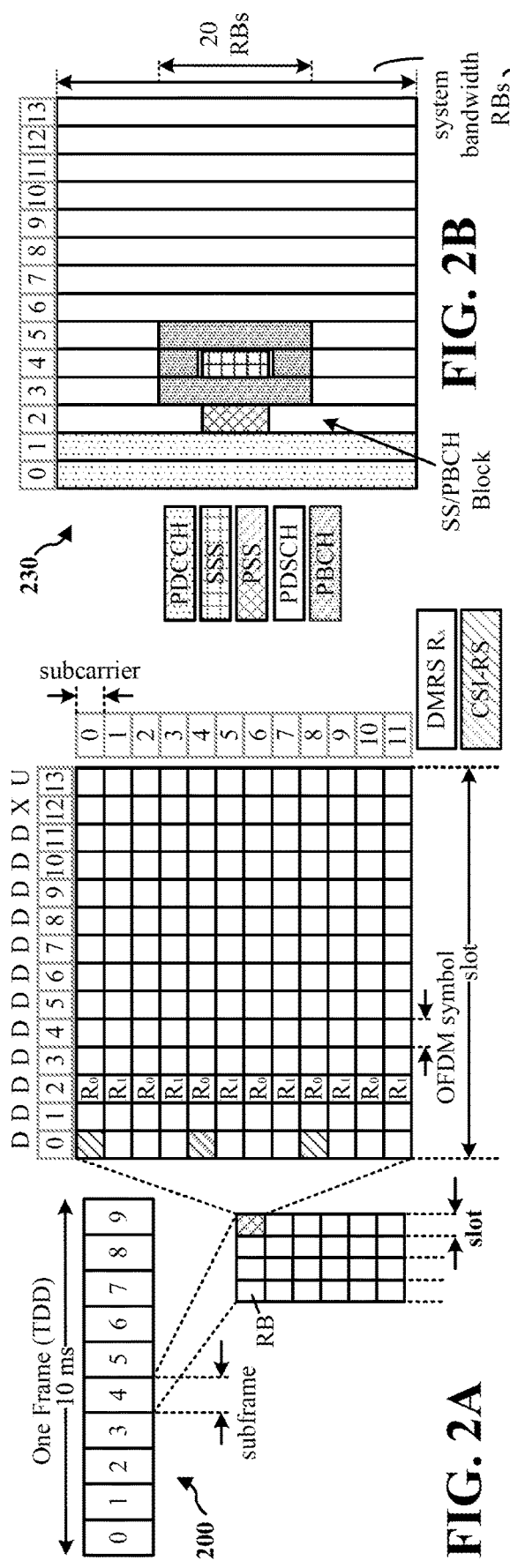
FIG. 2A is a diagram illustrating an example of a first frame, in accordance with certain aspects of the present description.
Figure 2B:
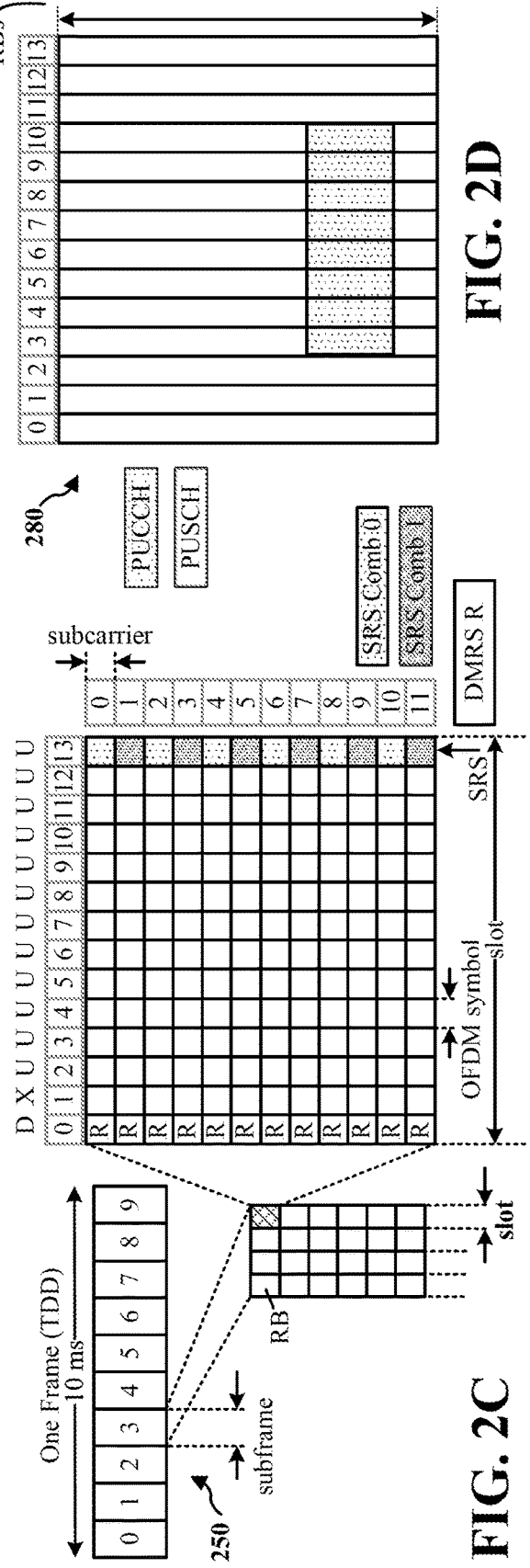
FIG. 2B is a diagram illustrating an example of DL channels within a subframe, in accordance with certain aspects of the present description.
Figure 2C:
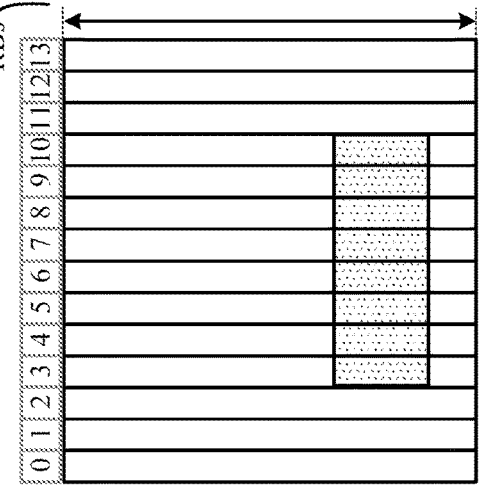
FIG. 2C is a diagram illustrating an example of a second frame, in accordance with certain aspects of the present description.
Figure 2D:
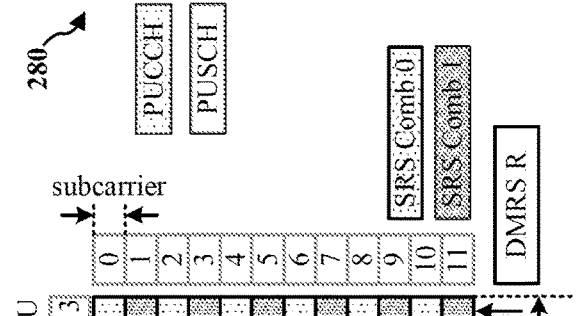
FIG. 2D is a diagram illustrating an example of a subframe, in accordance with certain aspects of the present description.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
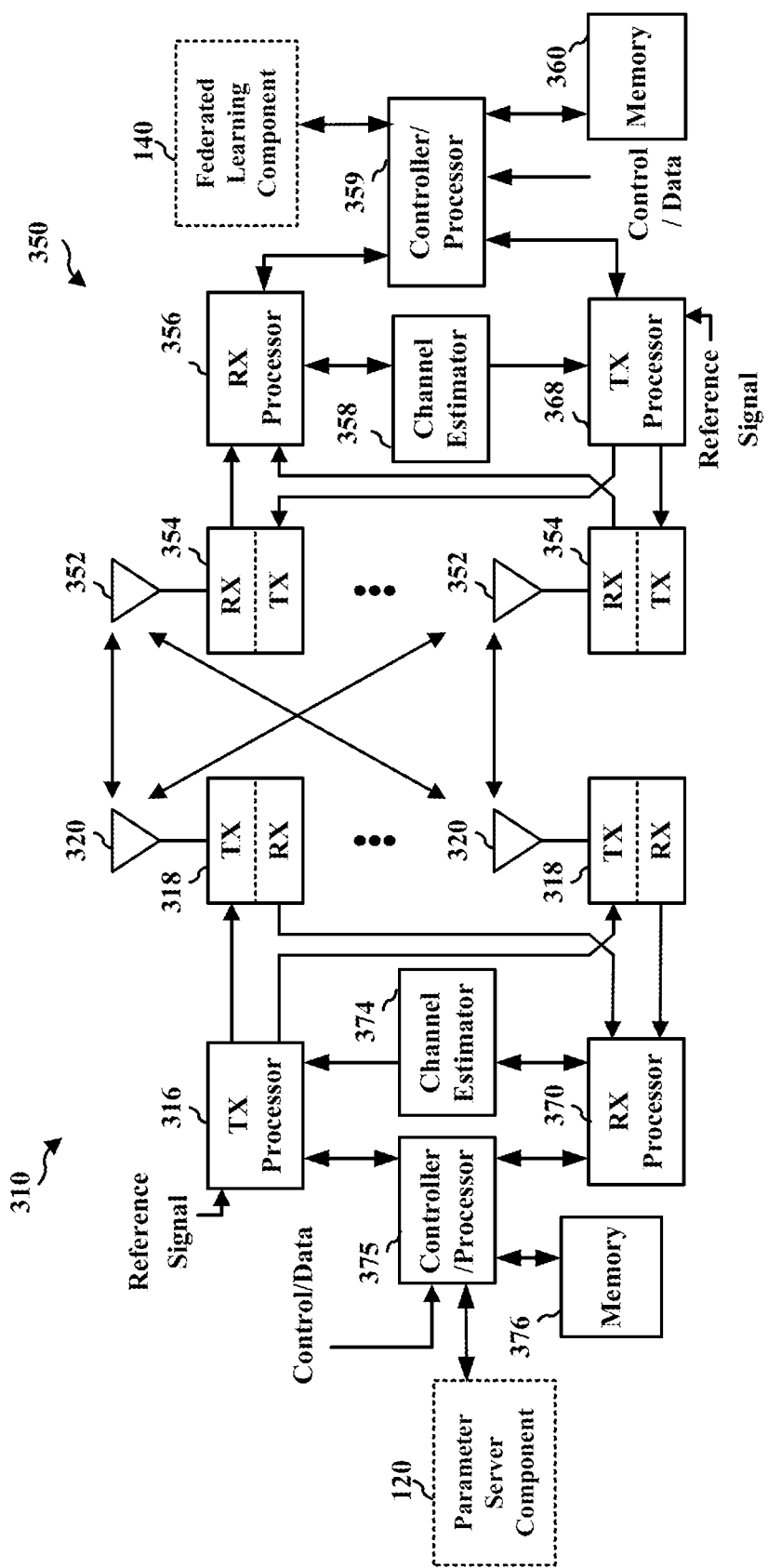
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the parameter server component 120 of FIG. 1.

At least one of the TX processor 368, the RX processor 356, and the controller/processor 359 may be configured to perform aspects in connection with the federated learning component 140 of FIG. 1.

Figure 4:
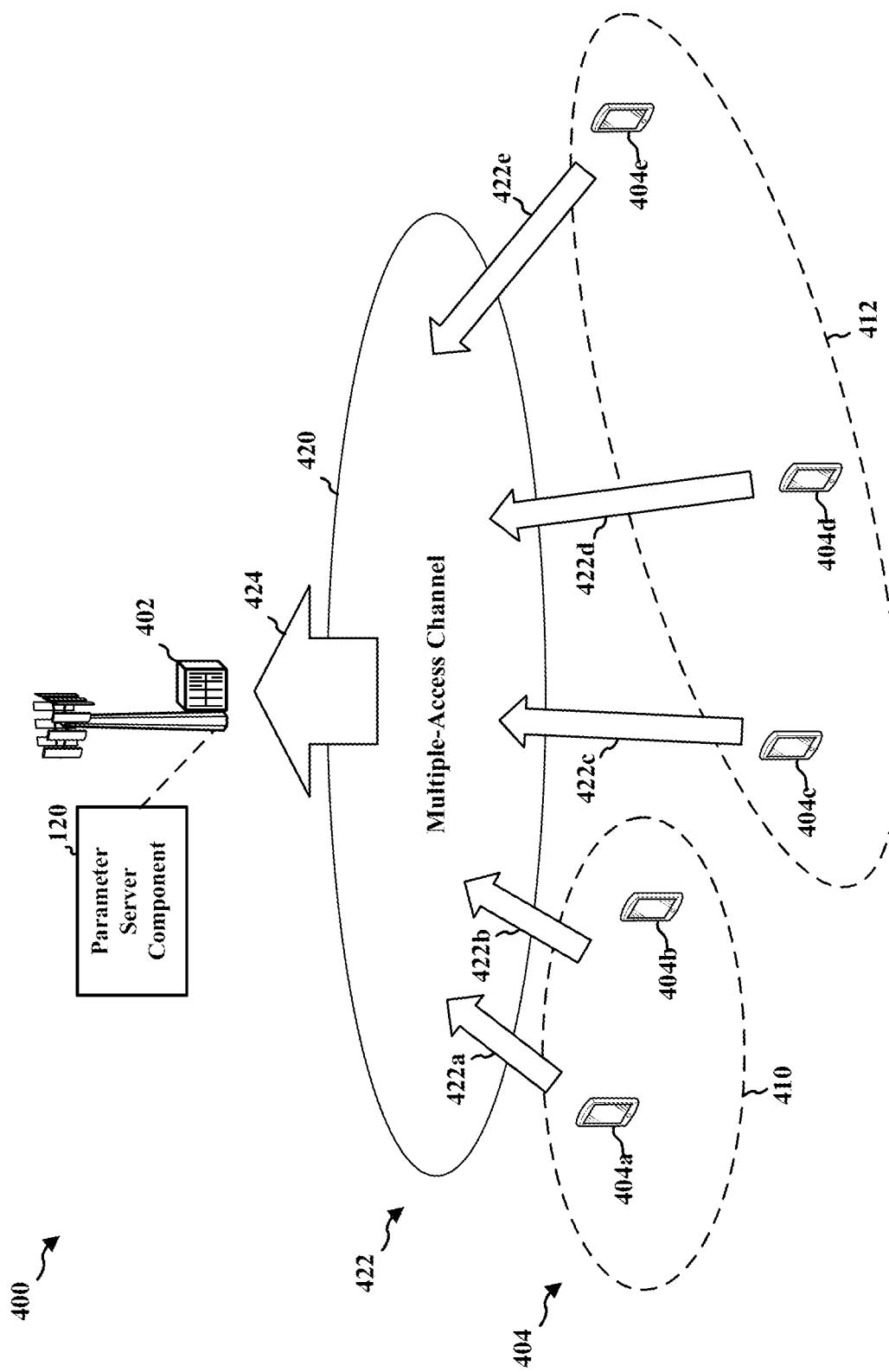
FIG. 4 is a diagram illustrating an example of over-the-air aggregation for federated learning, in accordance with certain aspects of the present description.

FIG. 4 is a diagram 400 illustrating an example of OTA aggregation for federated learning. A base station 402 may include the parameter server component 120. Each of a plurality of UEs 404 may include the federated learning component 140 (not shown). The base station 402 may be a serving base station of each of the UEs 404. That is, each of the UEs 404 may be connected to a cell of the base station 402. Accordingly, the base station 402 may have information about channel conditions and transmission power of each UE 404 from prior communications.

In an aspect, the base station 402 and/or the parameter server component 120 may divide the UEs 404 into one or more groups based on a common received power property for each group. Example received power properties may include pathloss or power budget. A common received power property may refer to properties that are substantially the same or within a range. For example, the base station 402 and/or the parameter server component 120 may place UE 404a and UE 404b in a first group 410. For instance, the UE 404a and UE 404b may have similar pathloss, e.g., because they are approximately the same distance from the base station 402 or experience similar channel conditions. As another example, the base station 402 and/or the parameter server component 120 may place the UE 404c, the UE 404d, and the UE 404e into a second group 412. For example, the UE 404c, the UE 404d, and the UE 404e may be associated with a pathloss that is within a range. As another example, the power budget may be a maximum transmission power, which may depend on whether the UE is charging or is operating on battery power. Further, the power budget may be affected by other transmissions. The received power property may change for different time-domain resources such as OFDM symbols, slots, or sub-frames. For example, a power headroom of a UE may be lower in symbols where the UE is configured to transmit control information or reference signals.

The base station 402 may transmit a global model for federated learning to some or all of the UEs 404. The global model may be, for example, a convolutional neural network (CNN). The model may be arranged in layers, with each layer including parameters defining weights for decisions. The global model for a first round of federated learning may include default parameters. In later rounds of federated learning, the global model may include the parameters selected following the previous round. In some implementations, the base station 402 and/or the parameter server component 120 may broadcast the global model to all of the UEs 404. In other implementations, the base station 402 may transmit the global model to UEs in the first group 410 and/or the second group 412.

The base station 402 may also identify uplink resources for transmitting the results of training. The uplink resources may depend on the group of the UE. For example, the first group 410 may be configured to transmit on a first symbol and the second group 412 may be configured to transmit on a second symbol. The UEs transmitting on the same uplink resources may transmit over the same multiple-access channel 420. Each UE 104 may transmit a respective amplitude modulated analog signal 422 (e.g., signals 422a, 422b, 422c, 422d, and 422e) on the uplink resources for the group of the UE. For example, the UE 404a may transmit the signal 422a on the same resources that the UE 404b transmits the signal 422b. The signals 422 that are transmitted on the same resources may be combined over the multiple-access channel 420 and received at the base station 402 and/or parameter server component 120 as a combined signal 424. For example, the amplitude of the combined signal 424 may be a total amplitude of the signal 422a and the signal 422b. Accordingly, the base station 402 and/or the parameter server component 120 may determine a total value signaled by the first group 410 of UEs. The base station 402 and/or the parameter server component 120 may also determine an average value signaled by the first group 410 of UEs. In an aspect, because the UEs 404a and 404b in the first group 410 have a similar received power property, aggregate function distortion due to amplitude misalignment may be mitigated.

In an aspect, the UE 404 in the second group 412 may transmit respective amplitude modulated analog signals 422c-422e on a second set of uplink resources. The amplitude modulated analog signals 422c-422e may be combined in the multiple-access channel 420 and received as a combined signal 424. The base station 402 and/or the parameter server component 120 may determine a total value signaled by the first group 410 of UEs and/or an average value. In an aspect, because the UEs 404c-404e in the second group 412 have a similar received power property, aggregate function distortion due to amplitude misalignment may be mitigated. The base station 402 and/or the parameter server component 120 may aggregate the values for the first group 410 and the second group 412. For example, the base station 402 and/or the parameter server component 120 may add the total values for each group and/or average the average values for each group. The base station 402 and/or the parameter server component 120 may weight the values based on the number of UEs in each group or the number of training samples for each UE. Accordingly, the base station 402 and/or the parameter server component 120 may determine a total and/or average value for all of the UEs 404 participating in a round of federated learning.

There may be a tradeoff between the number of devices participating in federated learning and the level of amplitude misalignment. Amplitude misalignment may be tolerated up to some point. In some implementations, the groups of UEs may not be mutually exclusive. For example, each group 410, 412 may be defined by a range of received power parameters, and the ranges may overlap. In some implementations, a UE 404 may be assigned to more than one group. Flexibility in grouping may increase the number of UEs participating in each OTA aggregation session.

Figure 5:
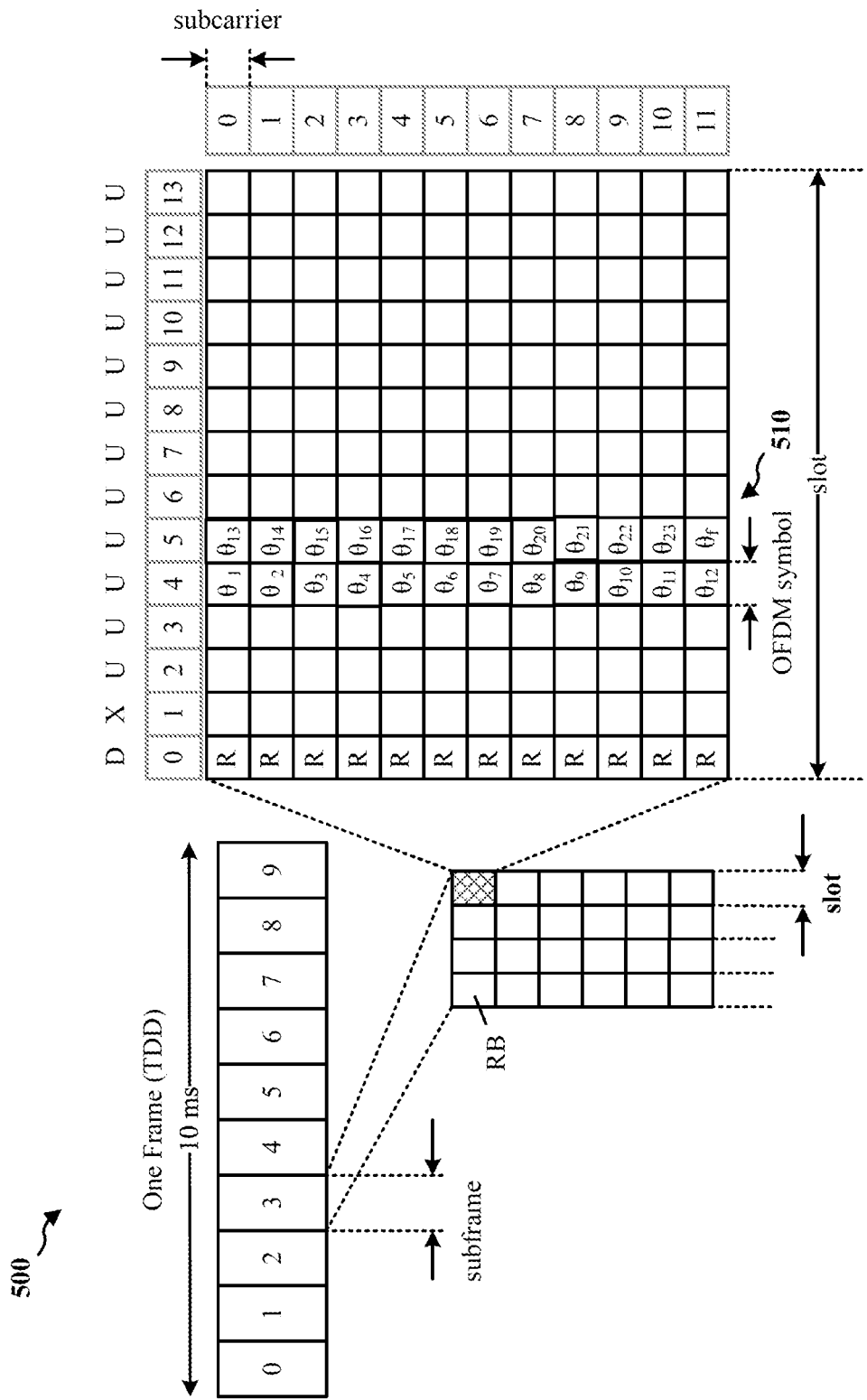
FIG. 5 is a diagram illustrating example resources for transmitting values associated with local epochs, in accordance with certain aspects of the present description.

FIG. 5 is a diagram 500 illustrating example resources for transmitting values associated with local epochs. The global model may be represented as θ. θ may be represented by a d-dimensional model parameter vector $R^d$. Each UE 404 may train the global model based on training samples in a local dataset to determine local epochs, e. For example, each UE 404 may apply a gradient descent algorithm. For each local epoch e, the UE 404 may adjust θ by $\mu_t \nabla F_k(\theta_{e,k})$, where $\mu_t$ is a learning rate, and $\nabla F_k$ is a gradient based on an optimized loss function. A number of local epochs may be determined over an aggregation period. For example, each epoch may correspond to an iteration of the gradient descent algorithm, and the result of the aggregation period may be communicated after the number of local epochs. The UE may provide values related to the trained model θ after the last local epoch of the aggregation period to the parameter server.

The UE 404 may transmit a value associated with each entry of θ separately on a resource element (RE) 510 with an index f. Each UE can send $\theta_k$ over d REs. $\theta_k$ may be represented by the following equation:

$$\theta_k = [\theta_{k,1}, \ldots, \theta_{k,f}, \ldots, \theta_{k,d}]^T$$

As illustrated in FIG. 5, each RE 510 is a combination of an OFDM symbol and subcarrier. Each UE 404 may be scheduled to transmit θ on the same REs. For example, the value transmitted on each RE may a parameter for the global model trained on a local set of training samples at each UE or a gradient for the parameter output from a final local epoch at the UE. The base station 402 may configure each UE 404 in a group 410, 412 with a number of REs 510 corresponding to a size of the vector representing θ.

As discussed above, the amplitude modulated signals transmitted by the UEs 404 may be combined over-the-air in the multiple-access channel 420 and be received at the base station 402 and/or parameter server component 120 as the combined signal 424. The received signal at the parameter server for a given RE for K users may be represented as $Y_f = \Sigma_{k=1}^K g_{k,f} h_{k,f}^{(UL)} \theta_{k,f} + Z_f$, where $g_{k,f}$ is a Tx scaling factor, $h_{k,f}^{(UL)}$ is a channel gain and $Z_f$ is noise.

Power control may be used to achieve a desired aggregation function in the parameter server. The desired aggregation function may be equal to $$\sum_{k=1}^K \frac{n_k}{n} \theta_{k,f},$$

where $n_k$ is the number of training samples in the kth user and n is the total number of training samples for all users. That is, $g_{k,f}$ may be set for each UE to make $Y_f$ as close as possible in the mean squared errors (MSE) sense. The target received signal to noise ratio (SNR) for each user may be represented as $$\frac{\|g_{k,f} h_{k,f}^{(UL)} \theta_{k,f}\|_2^2}{\|Z_f\|_2^2}.$$

In an aspect, the UEs 404 may determine the amplitude for each RE using truncated channel inversion based on a power headroom and a threshold. Channel inversion may include selecting a value of $g_{k,f}$ that cancels out $h_{k,f}^{(UL)}$. For example, $g_{k,f}$ may be set to $$\frac{1}{h_{k,f}^{(UL)}}.$$

If $h_{k,f}^{(UL)}$ is close to 0, the power scaling factor $g_{k,f}$ may exceed a maximum transmission power or power headroom. The UE may truncate elements of θ corresponding to channels where the power scaling factor $g_{k,f}$ exceeds the threshold for truncated channel inversion.

Figure 6:
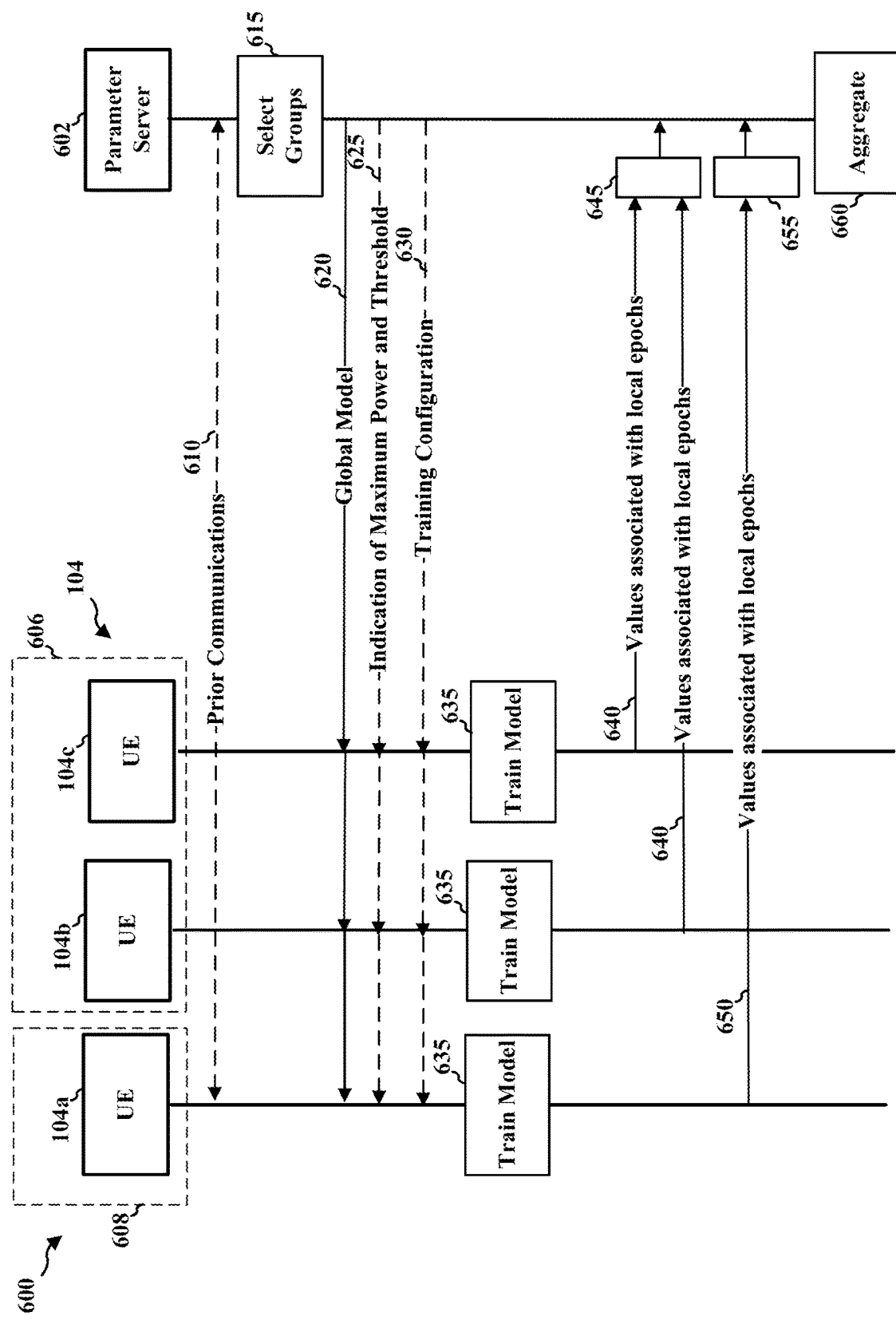
FIG. 6 is a diagram illustrating example communications and procedures between a parameter server and multiple UEs, in accordance with certain aspects of the present description.

FIG. 6 is a diagram 600 illustrating example communications and procedures between a parameter server 602 and multiple UEs 104. The parameter server 602 may be a base station 102 including a parameter server component 120. Each of the UEs 104 may include a federated learning component 140. Each of the UEs 104 may be connected to the parameter server 602. For example, the parameter server 602 may be the serving base station for the UEs 104. The UEs 104 may have prior communications 610 with the parameter server 602. For example, the parameter server 602 may receive measurement reports and channel state information, and the UEs 104 may receive scheduling and power control from the parameter server 602.

At block 615, the parameter server 602 may select groups for federated learning. As discussed above, the parameter server 602 may select the groups based on a common received power property. In general, the parameter server 602 may select UEs 104 for each group that are likely to transmit a signal that would result in the same SNR at the parameter server 602. For example, the parameter server 602 may select UEs 104 with a pathloss that is within a range that will result in a tolerable difference between SNR. As another example, the parameter server 602 may select UEs 104 with a similar power budget (e.g., a reported power headroom or charging status). For illustrative purposes, UEs 104b and 104c may be in a first group 606 and the UE 104a may be in a second group 608 with other UEs (not shown).

The parameter server 602 may transmit a global model 620 to each of the UEs 104 participating in the round of federated learning. Even if UEs 104 are in different groups, the UEs 104 may start with the same global model 620. The parameter server 602 may, for example, broadcast the global model 620.

In some implementations, the parameter server 602 may control the transmit power of the UEs 104. The parameter server 602 may, for example, transmit an indication 625 of a maximum power and threshold. The maximum power may be the maximum power that each UE is to use for transmitting the results of federated learning. The threshold may be a threshold for truncated channel inversion. For instance, the threshold may define values that should be dropped because the power for truncated channel inversion would be greater than the threshold. The maximum power and threshold may be specific for each UE 104, or may be common for UEs 104 in a group.

In some implementations, the parameter server 602 may configure the UEs 104 to autonomously select a transmission power. The parameter server 602 may transmit a training configuration 630. The training configuration 630 may include rules for a UE to determine a maximum transmission power and threshold for truncated channel inversion as a function of pathloss and a number of training samples. The training configuration may be the same for each UE in the group.

At block 635, each UE 104 may train the global model 620 based on a local dataset of training data to determine a plurality of local epochs. For example, in some implementations, each UE 104 may perform gradient descent training over multiple rounds to arrive at a final local epoch, which may be associated with a set of parameter values for a trained model and/or a gradient for the parameter values.

The UEs 104 may transmit the results of the training based on their groups. For example, the UE 104*b* and UE 104*c* in group 606 may transmit their results on the same time and frequency resources as illustrated in FIG. 5. In an aspect, each UE may perform truncated channel inversion based on a power headroom and a threshold for truncated channel inversion to determine an amplitude modulated analog signal for transmission on each resource element. The transmissions 640 for each UE 104 in the first group 606 may be an amplitude modulated analog signal to the parameter server for each of the plurality of local epochs. The transmission power for the transmission 640 is scaled based on a value associated with the local epoch (e.g., the parameter value or the gradient). Because the UEs in the first group 606 transmit on the same resources, the transmissions combine in a multiple access channel 645. Accordingly, the parameter server 602 receives a combined signal that represents a combined response from the first group 606 of UEs. Similarly, the UEs 104 in the second group 608 may transmit their training results on a second set of time and frequency domain resources. The transmission 650 may be an amplitude modulated analog signal to the parameter server for each of the plurality of local epochs. The transmission power for the transmission 650 is scaled based on a value associated with the local epoch. The transmission 650 are combined over the multiple access channel 655. Accordingly, the parameter server 602 may receive a combined signal for each group 606, 608 of UEs.

At block 660, the parameter server 602 may further aggregate the combined signals from multiple groups of UEs. The aggregation in block 660 may include, for example, summing the values represented by the combined signals, or determining an average of the values represented by the combined signals. For instance, the parameter server 602 may determine a weighted average based on the number of training samples for each group.

Figure 7:
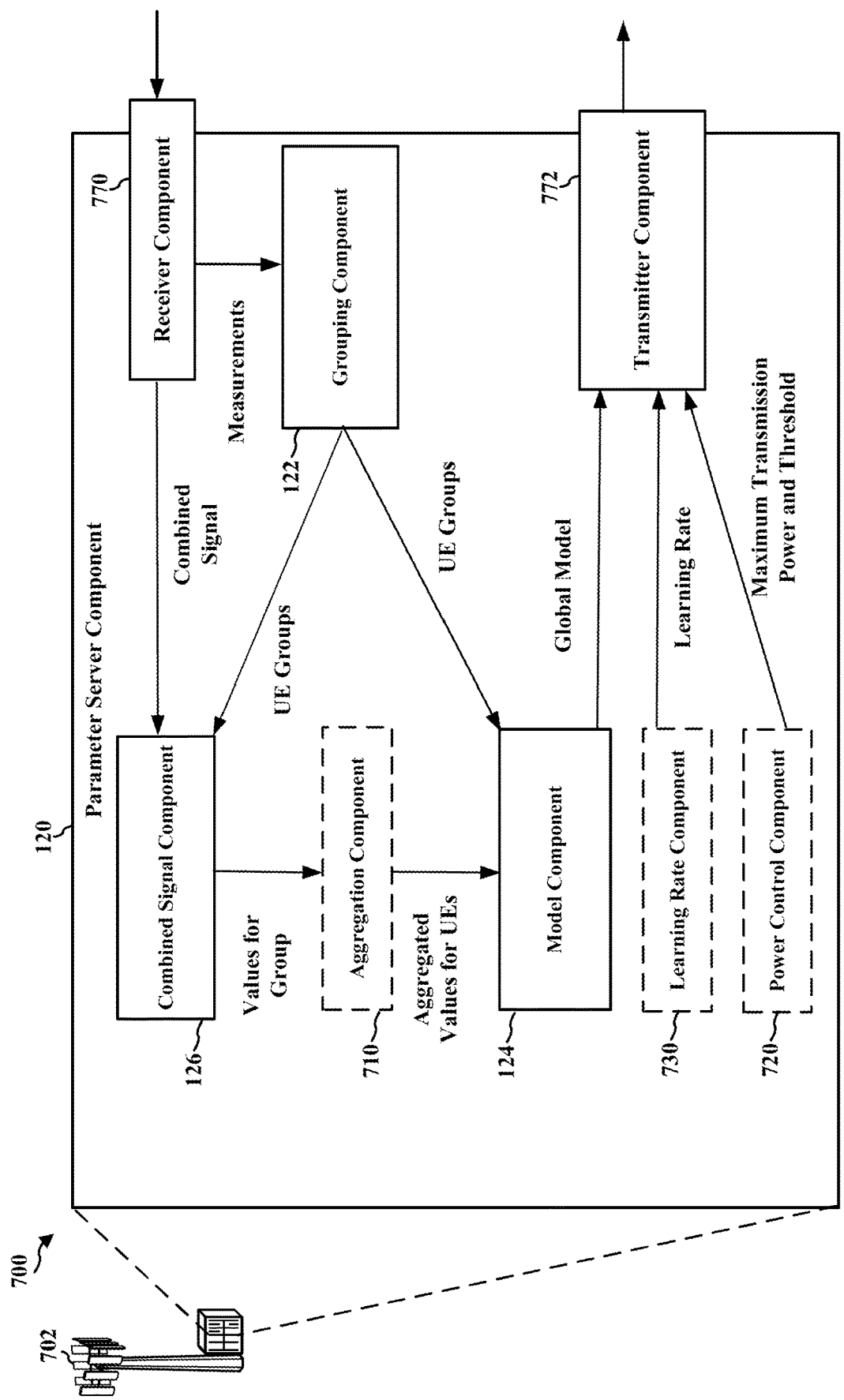
FIG. 7 is a conceptual data flow diagram illustrating the data flow between different means/components in an example base station, in accordance with certain aspects of the present description.

FIG. 7 is a conceptual data flow diagram 700 illustrating the data flow between different means/components in an example base station 702. The base station 702 may be an example of the base station 102, the base station 180, the base station 402, or the parameter server 602. The base station 702 may include the parameter server component 120. As discussed above with respect to FIG. 1, the base station 702 may include the grouping component 122, the model component 124, and the combined signal component 126. In some implementations, the base station 702 may optionally include one or more of an aggregation component 710, a power control component 720, or a learning rate component 730. The base station 702 may include a receiver component 770 and a transmitter component 772. The receiver component 770 may include, for example, a radio-frequency (RF) receiver for receiving the signals described herein. The transmitter component 772 may include for example, an RF transmitter for transmitting the signals described herein. In an aspect, the receiver component 770 and the transmitter component 772 may be co-located in a transceiver.

The receiver component 770 may receive measurements from the UEs 104. For example, the UEs 104 may provide measurement reports and/or channel state information to the base station 702. The UEs may also provide a power headroom. In some implementations, the receiver component 770 may perform measurements on received signals. For example, the receiver component 770 may measure a received signal strength indicator (RSSI) or reference signal received power (RSRP), which may be used to determine the pathloss between the UE and the base station 702. The receiver component 770 may provide the measurements to the grouping component 122. The receiver component 770 may also receive the combined signals 424. The receiver component 770 may provide the combined signals 424 to the combined signal component 126.

The grouping component 122 may receive measurements from the receiver component 770. The grouping component 122 may selecting one or more groups of UEs for separate OTA aggregation sessions of a federated learning round based on a common received power property of each group of UEs. For example, the grouping component 122 may group UEs based on similar pathloss and/or power budget. The grouping component 122 may provide UE groupings to the model component 124 and the combined signal component 126.

The model component 124 may receive the UE groups from the grouping component 122. In a first round of federated learning, the model component 124 may generate a global model. The general model may be, for example, an untrained machine learning model configured for a particular machine learning task to be performed by the UEs 104. After the first round of federated learning, the model component 124 may receive a combined signal and/or an aggregated signal indicating parameters of a trained model determined by the UEs or adjustments to the parameters of the global model. The model component 124 may adjust the global model based on the received values related to the parameters of the model. The model component 124 may transmit the global model to the UEs 104. For example, the model component 124 may broadcast the global model to all of the UEs selected for at least one group. In some implementations, the model component 124 may transmit information about the groups to the UEs. For example, the model component 124 may indicate the uplink resources for each group to report the results of the training.

The combined signal component 126 may receive the combined signal 424 for a group of UEs from the receiver component 770. The combined signal 424 may be an amplitude modulated analog signal. Accordingly, the received amplitude of the combined signal 424 may represent a total value for each of the UEs in the group. The combined signal component 126 may determine a value (e.g., δ or an associated gradient) for parameters of the global model based on the combined signal 424. The combined signal component 126 may determine the total value for each parameter and/or an average value for the parameter. In some implementations, the combined signal component 126 may provide the parameter values for each group of UEs to the aggregation component 710. In some implementations, where there is a single group of UEs or no aggregation component 710, the combined signal component 126 may provide the values for the group directly to the model component 124.

The aggregation component 710 may receive the values for each group of UEs from the combined signal component 126. The aggregation component 710 may aggregate the values for multiple groups of UEs. For example, the aggregation component 710 may sum total values to generate a total value for all UEs, or average values for groups to determine average values. The aggregation component 710 may weight average values by the number of samples for each UE or group and/or by a confidence level for each UE or group. For example, a group with a small range of pathloss may generate an average value with greater reliability than a group with a large range of pathloss. The aggregation component 710 may provide the aggregated values for all UEs to the model component 124.

In some implementations, the parameter server component 120 may include a power control component 120 configured to control transmission power at the UEs 104 for federated learning. For example, power control component 120 may determine a maximum transmission power for each UE based on the pathloss for the UE. The power control component 720 may determine a threshold for truncated channel inversion according to a maximum or mean of the relevant gradient vector or model parameter vector. For example, the threshold for truncated channel inversion may be set to a number of standard deviations from the mean to prevent outliers from exceeding the maximum transmission power and/or exerting outsized influence on the combined signal. The power control component 720 may transmit the maximum transmission power and a threshold for truncated channel inversion to one or more UEs via the transmitter component 772. In some implementations, the power control component 720 may configure the UEs 104 to determine the maximum transmission power and threshold. For example, the power control component 720 may configure one or more groups of UEs with a rule for determining the maximum transmission power and the threshold for truncated channel inversion as a function of a pathloss and a number of training samples. For example, users can set their transmission power (TxPower) as TxPower=PathLoss*(number of training samples)*(number of REs)*(scaling factor that represents target received power at gNB per unit value and per training sample and per RE).

In some implementations, the parameter server component 120 may include a learning rate component 730 configured to jointly optimize a learning rate and a power control scaling factor to minimize aggregation error. The learning rate, $\mu_t$, may affect the magnitude of $\theta$ and/or the related gradients determined at each UE. The learning rate component 730 may configure the learning rate based on an anticipated aggregation error for a range of the common transmission power property for each group. For example, in some implementations, where the grouping component 122 selects groups with a greater range of received power parameters (e.g., with expectation of some aggregation error due to power misalignment), the learning rate component 730 may decrease the learning rate.

Figure 8:
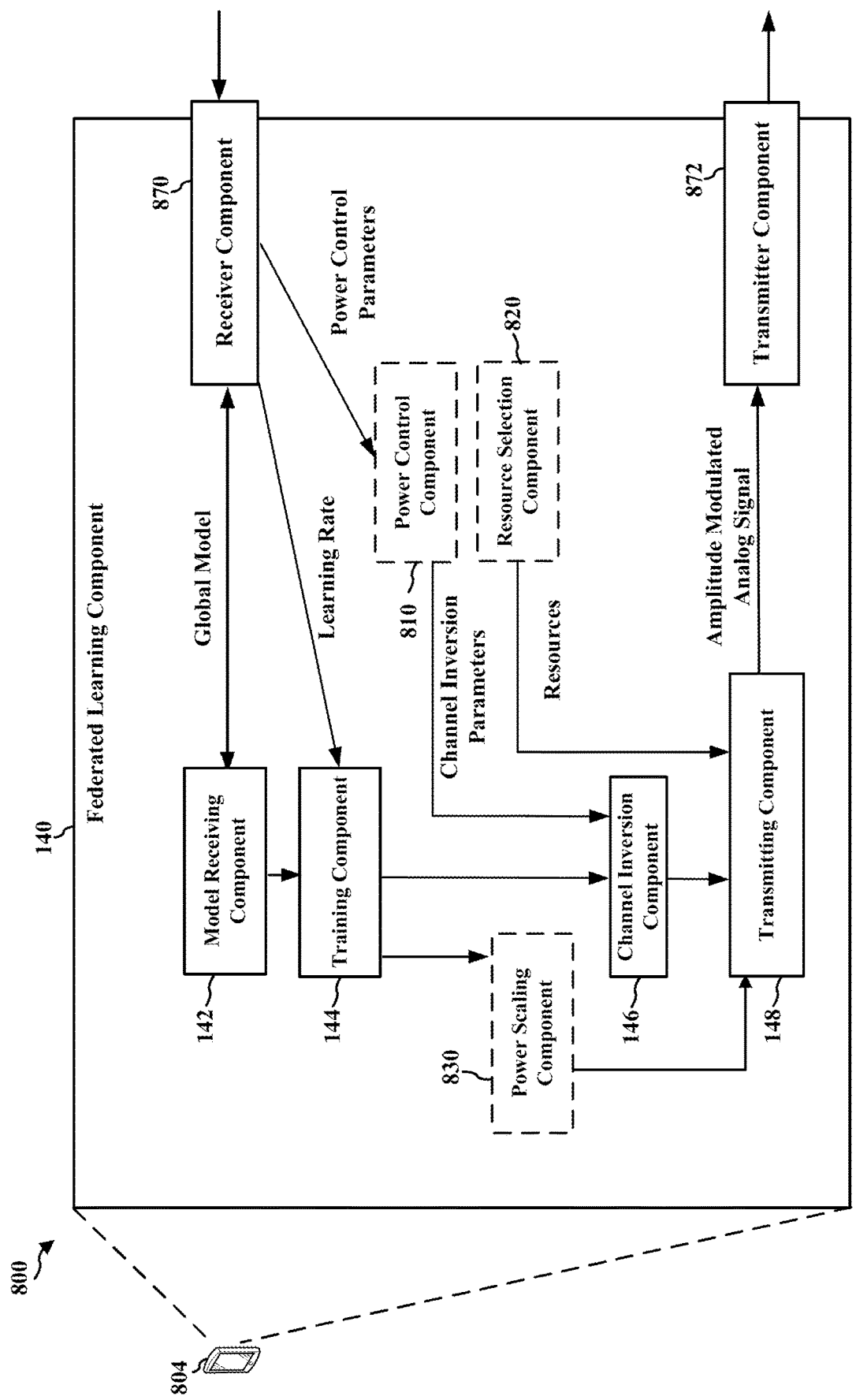
FIG. 8 is a conceptual data flow diagram illustrating the data flow between different means/components in an example UE, in accordance with certain aspects of the present description.

FIG. 8 is a conceptual data flow diagram 800 illustrating the data flow between different means/components in an example UE 804. The UE 804 may be an example of the UE 104 or the UE 404. The UE 804 may include the federated learning component 140. As discussed above with respect to FIG. 1, the federated learning component 140 may include the model receiving component 142, the training component 144, the channel inversion component 146, and the transmitting component 148. In some implementations, the UE 804 may optionally include one or more of a power control component 810, a resource selection component 820, or a power scaling component 830. The UE 804 may include a receiver component 870 and a transmitter component 872. The receiver component 870 may include, for example, a RF receiver for receiving the signals described herein. The transmitter component 872 may include for example, an RF transmitter for transmitting the signals described herein. In an aspect, the receiver component 870 and the transmitter component 872 may be co-located in a transceiver.

The receiver component 870 may receive communications from the base station 102, base station 402, parameter server 602, or base station 702. For example, the receiver component 870 may receive the global model 620. For instance, the global model 620 may be received over a broadcast channel, multicast channel, or unicast channel. The receiver component 870 may forward the global model to the model receiving component 142. In some implementations, the receiver component 870 may receive power control parameters from the base station 702. For example, the power control parameters may include a maximum transmission power and/or threshold for truncated channel inversion. In some implementations, the power control parameters may include a configuration for determining the power headroom and the threshold for truncated channel inversion as a function of pathloss and a number of training samples. The receiver component 870 may provide the power control parameters to the power control component 810. In some implementations, the receiver component 870 may receive a learning rate or other training configuration information from the base station 702. The receiver component 870 may provide the learning rate or other training configuration information to the training component 144.

The model receiving component 142 may receive the global model from the receiver component 870. The model receiving component 142 may be configured to prepare the global model for training. For example, the model receiving component 142 may store the global model in a memory and configure the UE 804 to collect training data based on the global model. The model receiving component 142 may provide the global model and training data to the training component 144.

The training component 144 may receive the global model and training data from the model receiving component 142. The training component 144 may train the global model based on the training data. In some implementations, the training component 144 may be configured to perform gradient descent training according to the gradient descent algorithm. The training component 144 may determine a plurality of local epochs. The training component 144 may determine values associated with at least a final local epoch. For example, the values may a vector representing $\theta$ or a gradient associated with $\theta$. The training component 144 may provide the values to the channel inversion component 146.

The channel inversion component 146 may receive the values associated with $\theta$ from the training component 144. The channel inversion component 146 may receive channel inversion parameters from the power control component 810. For example, the channel inversion parameters may include the maximum transmission power and the threshold for truncated channel inversion. The channel inversion component 146 may be configured to perform truncated channel inversion. For instance, the channel inversion component 146 may determine a value of a power scaling factor $(g_{k,f})$ that cancels out an uplink channel loss $(h_{k,f}^{(UL)})$. The channel inversion component 146 may determine a transmit power for each value based on the power scaling factor. The channel inversion component 146 may determine whether the determined transmit power exceeds the threshold for truncated power inversion. The channel inversion component 146 may truncate values where the transmit power exceeds the threshold for truncate power inversion. For example, the channel inversion component 146 may not transmit such values. The channel inversion component 146 may provide amplitudes for transmission to the transmitting component 148.

The transmitting component 148 may receive the amplitudes from the channel inversion component 146. The transmitting component 148 may generate an amplitude modulated analog signal for transmission to the parameter server for each of the plurality of values. The transmitting component 148 may scale the transmission power based on the value associated with the local epochs. The transmitting component 148 may transmit the amplitude modulated analog signal via the transmitter component 872.

In some implementations, the federated learning component 140 may include the power control component 810 for performing power control. The power control component 810 may receive power control parameters from the receiver component 870. The power control component 810 may provide channel inversion parameters to the channel inversion component 146. The channel inversion parameters may include, for example, a power headroom and threshold for truncated power inversion. In some implementations, where the parameter server 602 provides the maximum transmission power and the threshold for truncated channel inversion, the power control component 810 may determine the power headroom from the maximum transmission power. In some implementations, where the parameter server 602 configures to power control component 810 with a rule, the power control component 810 may determine the power headroom and the threshold for truncated channel inversion as a function of pathloss and a number of training samples. In some implementations, the power control component 810 may autonomously determine the power headroom and the threshold for truncated channel inversion based on a tradeoff between transmit power penalty and value accuracy. In any case, the power control component 810 may provide the channel inversion parameters to the channel inversion component 146.

In some implementations, the federated learning component 140 may include a resource selection component 820. The resource selection component 820 may be configured to select resources for uplink transmission. For example, the resource selection component 820 may select the uplink resources configured for a group of the UE 804. In some implementations, the resource selection component 820 may choosing a configured uplink resource for transmitting the amplitude modulated analog signal based on a downlink pathloss. In some implementations, all of the UEs in the group may be configured to select the same uplink resources. In some implementations, the UEs may self-group based on downlink pathloss, or form sub-groups based on the downlink pathloss.

In some implementations, the federated learning component 140 may include a power scaling component 830. The power scaling component 830 may be configured to further scale a transmission power based on a confidence level of a gradient estimate after a last local epoch. For example, the power scaling component 830 may receive a confidence level from the training component 144 for one or more values. The power scaling component 830 may, for example, scale down a transmission power determined via the channel inversion process if there is a low confidence level for the value.

Figure 9:
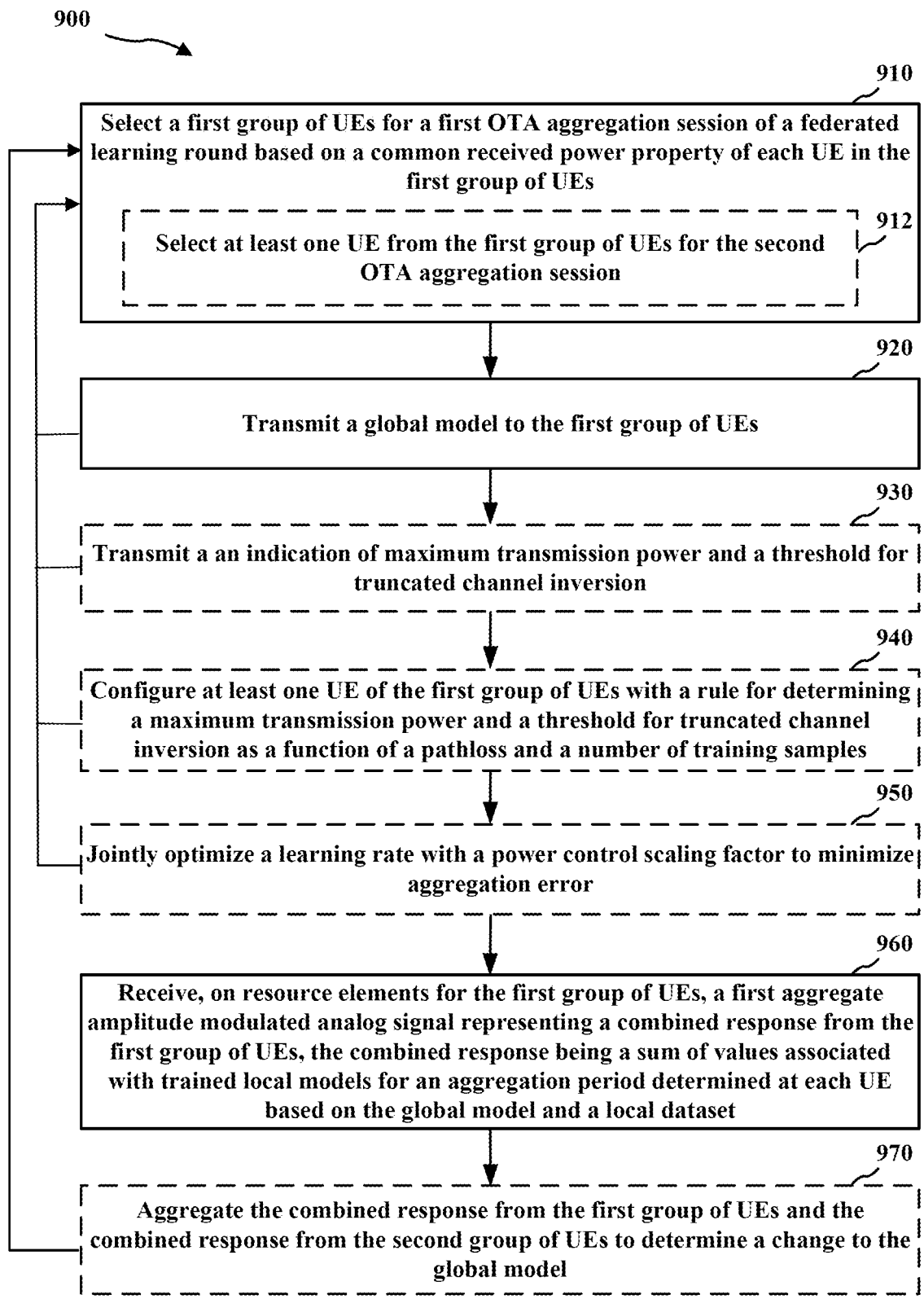
FIG. 9 is a flowchart of an example method for federated learning for a base station, in accordance with certain aspects of the present description.

FIG. 9 is a flowchart of an example method 900 for performing federated learning. The method 900 may be performed by one or more base stations (such as the base station 102, which may include the memory 376 and which may be the entire base station 102 or a component of the base station 102 such as the parameter server component 120, TX processor 316, the RX processor 370, or the controller/processor 375). The method 900 may be performed by the parameter server component 120 in communication with a federated learning component 140 at each of a plurality of UEs 104.

At block 910, the method 900 may include selecting a first group of UEs for a first OTA aggregation session of a federated learning round based on a common received power property of each UE in the first group of UEs. In an aspect, for example, the base station 102, the controller/processor 375, and/or the TX processor 316 may execute the parameter server component 120 and/or the grouping component 122 to select a first group 410 of UEs 404 for a first OTA aggregation session of a federated learning round based on a common received power property of each of the first group of UEs. In some implementations, the grouping component 122 may select multiple groups 412 of UEs for different OTA aggregation sessions of the federated learning round based on the common received power property. For example, the common received power property may be a pathloss or UE power budget. In some implementations, the common received power property may change for different time-domain resources such as OFDM symbols, slots, or sub-frames. For instance, a UE may be in a first group during one slot, but move to a second group in a different slot if the UE power budget changes. In some implementations, at sub-block 912, the block 910 may optionally include selecting at least one UE from the first group of UEs (e.g., UE 404b) for the second OTA aggregation session (e.g., for the second group 412). Including at least one UE in multiple groups may increase the number of participating UEs in the federated learning. Accordingly, the base station 102, the controller/processor 375, and/or the TX processor 316 executing the parameter server component 120 and/or the grouping component 122 may provide means for selecting a first group of UEs for a first OTA aggregation session of a federated learning round based on a common received power property of each of the first group of UEs.

At block 920, the method 900 may include transmitting a global model to the first group of UEs. In an aspect, for example, the base station 102, the controller/processor 375, and/or the TX processor 316 may execute the parameter server component 120 and/or the model component 122 to transmit a global model 620 to the first group 410, 606 of UEs. In implementations with multiple groups of UEs, the block 920 may be repeated for each group of UEs or include transmitting the global model to all of the UEs. Accordingly, the base station 102, the controller/processor 375, and/or the TX processor 316 executing the parameter server component 120 and/or the model component 122 may provide means for transmitting a global model to the first group of UEs.

At block 930, the method 900 may optionally include transmitting an indication of a maximum transmission power and a threshold for truncated channel inversion. In an aspect, for example, the base station 102, the controller/processor 375, and/or the TX processor 316 may execute the parameter server component 120 and/or the power control component 720 to transmit an indication 625 of a maximum transmission power and a threshold for truncated channel inversion. Accordingly, the base station 102, the controller/processor 375, and/or the TX processor 316 executing the parameter server component 120 and/or the power control component 720 may provide means for transmitting an indication of a maximum transmission power and a threshold for truncated channel inversion.

At block 940, the method 900 may optionally include configuring at least one UE of the first group of UEs with a rule for determining a maximum transmission power and a threshold for truncated channel inversion as a function of a pathloss and a number of training samples. In an aspect, for example, the base station 102, the controller/processor 375, and/or the TX processor 316 may execute the parameter server component 120 and/or the power control component 720 to configure at least one UE of the first group of UEs with a rule for determining a maximum transmission power and a threshold for truncated channel inversion as a function of a pathloss and a number of training samples. Accordingly, the base station 102, the controller/processor 375, and/or the TX processor 316 executing the parameter server component 120 and/or the power control component 720 may provide means for configuring at least one UE of the first group of UEs with a rule for determining a maximum transmission power and a threshold for truncated channel inversion as a function of a pathloss and a number of training samples.

At block 950, the method 900 may optionally include jointly optimizing a learning rate with a power control scaling factor to minimize aggregation error. In an aspect, for example, the base station 102, the controller/processor 375, and/or the TX processor 316 may execute the parameter server component 120 and/or the learning rate component 730 to jointly optimize a learning rate with a power control scaling factor to minimize aggregation error. In some implementations, jointly optimizing the learning rate may include configuring the learning rate based on an anticipated aggregation error for a range of the common transmission power property. For example, the power control component 720 may transmit the training configuration 630 including the learning rate to each UE. Accordingly, the base station 102, the controller/processor 375, and/or the TX processor 316 executing the parameter server component 120 and/or the learning rate component 730 may provide means for jointly optimizing a learning rate with a power control scaling factor to minimize aggregation error.

In some implementations, the method 900 may include performing blocks 910, 920, 930, 940, and/or 950 for each group of UEs.

At block 960, the method 900 may include receiving, on resource elements for the first group of UEs, a first aggregate amplitude modulated analog signal representing a combined response from the first group of UEs. The combined response may be a sum of values associated with trained local models for an aggregation period determined at each UE based on the global model and a local dataset. In an aspect, for example, the base station 102, the controller/processor 375, and/or the RX processor 370 may execute the parameter server component 120 and/or the combined signal component 126 to receive, on resource elements for the first group of UEs, a first aggregate amplitude modulated analog signal (e.g., combined signal 424) representing a combined response from the first group of UEs. The combined signal 424 may be a sum of values associated with trained local models for an aggregation period determined at each UE based on the global model and a local dataset. In some implementations, the values associated with the trained local models are parameters (e.g., $\theta_f$) for the global model trained on a local set of training samples at each UE. In some implementations, the values associated with the trained local models are gradients (e.g., $\nabla F_k$) output from local epochs. Accordingly, the base station 102, the controller/processor 375, and/or the RX processor 370 executing the parameter server component 120 and/or the combined signal component 126 may provide means for receiving, on specified resource elements for the first group of UEs, a first aggregate amplitude modulated analog signal representing a combined response from the first group of UEs, the combined signal being a sum of values associated with trained local models for an aggregation period determined at each UE based on the global model and a local dataset.

At block 970, the method 900 may optionally include aggregating the combined response from the first group of UEs and the combined response from the second group of UEs to determine a change to the global model. In an aspect, for example, the base station 102, the controller/processor 375, and/or the RX processor 370 may execute the parameter server component 120 and/or the aggregation component 710 to aggregate the combined response from the first group of UEs and the combined response from the second group of UEs to determine a change to the global model. Accordingly, the base station 102, the controller/processor 375, and/or the RX processor 370 executing the parameter server component 120 and/or the aggregation component 710 may provide means for aggregating the combined response from the first group of UEs and the combined response from the second group of UEs to determine a change to the global model.

Figure 10:
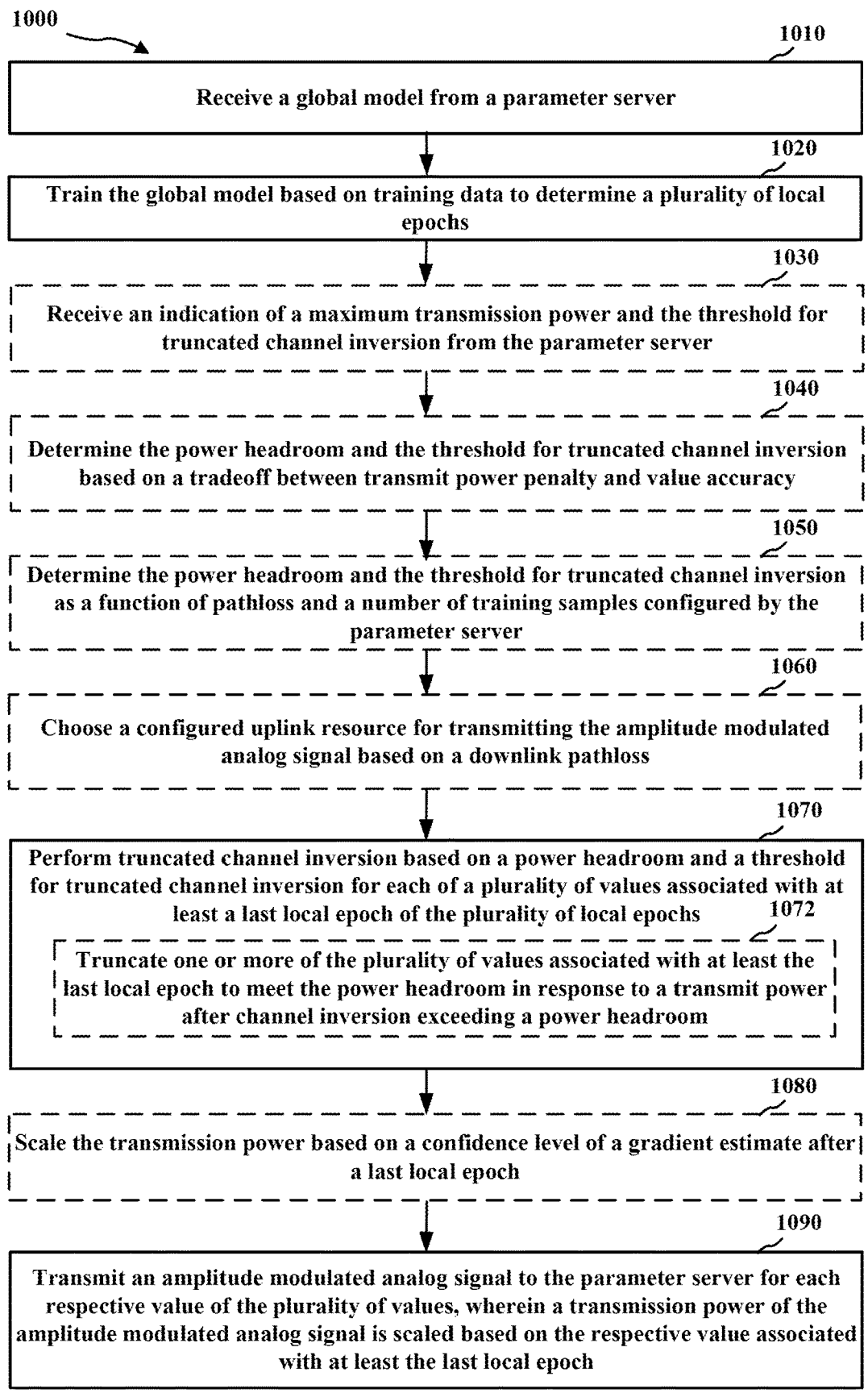
FIG. 10 is a flowchart of an example method for federated learning at a UE, in accordance with certain aspects of the present description.

FIG. 10 is a flowchart of an example method 1000 for performing federated learning at a UE. The method 1000 may be performed by one or more UEs (such as the UE 104, which may include the memory 360 and which may be the entire UE 104 or a component of the UE 104 such as the federated learning component 140, TX processor 368, the RX processor 356, or the controller/processor 359. The method 1000 may be performed by the federated learning component 140 at a UE 104 in communication with a parameter server component 120 at a base station 102.

At block 1010, the method 1000 may include receiving a global model from a parameter server. In an aspect, for example, the UE 104, the RX processor 356, and/or the controller/processor 359 may execute the federated learning component 140 and/or the model receiving component 142 to receive a global model 620 from a parameter server. Accordingly, the UE 104, the RX processor 356, and/or the controller/processor 359 executing the federated learning component 140 and/or the model receiving component 142 may provide means for receiving a global model from a parameter server.

At block 1020, the method 1000 may include training the global model based on training data to determine a plurality of local epochs. In an aspect, for example, the UE 104, the TX processor 368, the RX processor 356, and/or the controller/processor 359 may execute the federated learning component 140 and/or the training component 144 to train the global model based on training data to determine a plurality of local epochs. In some implementations, the training component 144 may train the global model using the gradient descent algorithm. Accordingly, the UE 104, the TX processor 368, the RX processor 356, and/or the controller/processor 359 executing the federated learning component 140 and/or the training component 144 may provide means for training the global model based on training data to determine a plurality of local epochs.

At block 1030, the method 1000 may optionally include receiving an indication of a maximum transmission power and the threshold for truncated channel inversion from the parameter server. In an aspect, for example, the UE 104, the RX processor 356, and/or the controller/processor 359 may execute the federated learning component 140 and/or the power control component 810 to receive an indication 625 of a maximum transmission power and the threshold for truncated channel inversion from the parameter server. Accordingly, the UE 104, the RX processor 356, and/or the controller/processor 359 executing the federated learning component 140 and/or the power control component 810 may provide means for receiving an indication of a maximum transmission power and the threshold for truncated channel inversion from the parameter server.

At block 1040, the method 1000 may optionally include determining the power headroom and the threshold for truncated channel inversion based on a tradeoff between transmit power penalty and value accuracy. In an aspect, for example, the UE 104, the TX processor 368, the RX processor 356, and/or the controller/processor 359 may execute the federated learning component 140 and/or the power control component 810 to determine the power headroom and the threshold for truncated channel inversion based on a tradeoff between transmit power penalty and value accuracy. Accordingly, the UE 104, the TX processor 368, the RX processor 356, and/or the controller/processor 359 executing the federated learning component 140 and/or the power control component 810 may provide means for determining the power headroom and the threshold for truncated channel inversion based on a tradeoff between transmit power penalty and value accuracy.

At block 1050, the method 1000 may optionally include determining the power headroom and the threshold for truncated channel inversion as a function of pathloss and a number of training samples configured by the parameter server. In an aspect, for example, the UE 104, the TX processor 368, the RX processor 356, and/or the controller/processor 359 may execute the federated learning component 140 and/or the power control component 810 to determine the power headroom and the threshold for truncated channel inversion as a function of pathloss and a number of training samples configured by the parameter server. Accordingly, the UE 104, the TX processor 368, the RX processor 356, and/or the controller/processor 359 executing the federated learning component 140 and/or the power control component 810 may provide means for determining the power headroom and the threshold for truncated channel inversion as a function of pathloss and a number of training samples configured by the parameter server.

At block 1060, the method 1000 may optionally include choosing a configured uplink resource for transmitting the amplitude modulated analog signal based on a downlink pathloss. In an aspect, for example, the UE 104, the TX processor 368, the RX processor 356, and/or the controller/processor 359 may execute the federated learning component 140 and/or the resource selection component 820 to choose a configured uplink resource for transmitting the amplitude modulated analog signal based on a downlink pathloss. Accordingly, the UE 104, the TX processor 368, the RX processor 356, and/or the controller/processor 359 executing the federated learning component 140 and/or the resource selection component 820 may provide means for choosing a configured uplink resource for transmitting the amplitude modulated analog signal based on a downlink pathloss.

At block 1070, the method 1000 may include performing truncated channel inversion based on a power headroom and a threshold for truncated channel inversion for each of a plurality of values associated with at least a last local epoch of the plurality of local epochs. In an aspect, for example, the UE 104, the TX processor 368, and/or the controller/processor 359 may execute the federated learning component 140 and/or the channel inversion component 146 to perform truncated channel inversion based on a power headroom and a threshold for truncated channel inversion for each of a plurality of values associated with at least a last local epoch of the plurality of local epochs. For example, in sub-block 1072, the block 1070 may include truncating one or more of the plurality of values associated with at least the last local epoch to meet the power headroom in response to a transmit power after channel inversion exceeding a power headroom. Accordingly, the UE 104, the TX processor 368, and/or the controller/processor 359 executing the federated learning component 140 and/or the channel inversion component 146 may provide means for performing truncated channel inversion based on a power headroom and a threshold for truncated channel inversion for each of a plurality of values associated with at least a last local epoch of the plurality of local epochs.

At block 1080, the method 1000 may optionally include scaling the transmission power based on a confidence level of a gradient estimate after a last local epoch. In an aspect, for example, the UE 104, the TX processor 368, the RX processor 356, and/or the controller/processor 359 may execute the federated learning component 140 and/or the power scaling component 830 to scale the transmission power based on a confidence level of a gradient estimate after a last local epoch. Accordingly, the UE 104, the TX processor 368, the RX processor 356, and/or the controller/processor 359 executing the federated learning component 140 and/or the power scaling component 830 may provide means for scaling the transmission power based on a confidence level of a gradient estimate after a last local epoch.

At block 1090, the method 1000 may include transmitting an amplitude modulated analog signal to the parameter server for each respective value of the plurality of values, wherein a transmission power of the amplitude modulated analog signal is scaled based on the respective value associated with at least the last local epoch. In an aspect, for example, the UE 104, the TX processor 368, and/or the controller/processor 359 may execute the federated learning component 140 and/or the transmitting component 148 to transmit an amplitude modulated analog signal to the parameter server for each of the plurality of values. The transmission power is scaled based on the value associated with at least the last local epoch. Accordingly, the UE 104, the TX processor 368, and/or the controller/processor 359 executing the federated learning component 140 and/or the transmitting component 148 may provide means for transmitting an amplitude modulated analog signal to the parameter server for each respective value of the plurality of values.

Some Further Example Clauses

Implementation examples are described in the following numbered clauses:

1. A method for federated learning at a base station, comprising:
   selecting a first group of user equipment (UEs) for a first over-the-air (OTA) aggregation session of a federated learning round based on a common received power property of each UE in the first group of UEs;
   transmitting a global model to the first group of UEs; and
   receiving, on resource elements for the first group of UEs, a first aggregate amplitude modulated analog signal representing a combined response from the first group of UEs, the combined signal being a sum of values associated with trained local models for an aggregation period determined at each UE based on the global model and a local dataset.
2. The method of clause 1, wherein the common received power property is a pathloss.
3. The method of clause 1, wherein the common received power property is a UE power budget.
4. The method of any of clauses 1-3, wherein the common received power property changes for different time-domain resources.
5. The method of any of clauses 1-4, further comprising:
   selecting a second group of UEs for a second OTA aggregation session of the federated learning round based on the common received power property of each UE in the second group of UEs;
   transmitting the global model to the second group of UEs;
   receiving, on resource elements for the second group of UEs, a second aggregate amplitude modulated analog signal representing a combined response from the second group of UEs, the combined response being a sum of values associated with trained local models for an aggregation period determined at each UE based on the global model; and
   aggregating the combined response from the first group of UEs and the combined response from the second group of UEs to determine a change to the global model.
6. The method of clause 5, wherein selecting the second group of UEs for a second OTA aggregation session comprises selecting at least one UE from the first group of UEs for the second OTA aggregation session.
7. The method of any of clauses 1-6, wherein the values associated with the trained local models are parameters for the global model trained on a local set of training samples at each UE.
8. The method of any of clauses 1-7, wherein the values associated with the trained local models are gradients output from a last local epoch of the aggregation period.
9. The method of clause 8, further comprising jointly optimizing a learning rate with a power control scaling factor to minimize aggregation error.
10. The method of clause 9, wherein jointly optimizing the learning rate comprises configuring the learning rate based on an anticipated aggregation error for a range of the common received power property.
11. The method of any of clauses 1-10, further comprising transmitting an indication of a maximum transmission power and a threshold for truncated channel inversion.
12. The method of any of clauses 1-10, further comprising configuring at least one UE of the first group of UEs with a rule for determining a maximum transmission power and a threshold for truncated channel inversion as a function of a pathloss and a number of training samples.
13. An apparatus for federated learning at a base station, comprising:
   a memory storing computer-executable instructions; and
   at least one processor communicatively coupled with the memory and configured to execute the instructions to perform the method of any of clauses 1-12.
14. An apparatus for wireless communication, comprising means for performing the method of any of clauses 1-12.
15. A non-transitory computer-readable medium storing computer executable code, the code when executed by a processor causes the processor to perform the method of any of clauses 1-12.
16. A method for federated learning at a UE, comprising:
   receiving a global model from a parameter server;
   training the global model based on training data to determine a plurality of local epochs;
   performing truncated channel inversion based on a power headroom and a threshold for truncated channel inversion for each of a plurality of values associated with at least a last local epoch of the plurality of local epochs; and
   transmitting an amplitude modulated analog signal to the parameter server for each respective value of the plurality of values, wherein a transmission power of the amplitude modulated analog signal is scaled based on the respective value associated with at least the last local epoch.
17. The method of clause 16, wherein performing truncated channel inversion comprises truncating one or more of the plurality of values associated with at least the last local epoch to meet the power headroom in response to a transmit power after channel inversion exceeding a power headroom.
18. The method of clause 16 or 17, further comprising receiving a maximum transmission power and the threshold for truncated channel inversion from the parameter server.
19. The method of any of clauses 16-18, further comprising determining the power headroom and the threshold for truncated channel inversion based on a tradeoff between transmit power penalty and value accuracy.
20. The method of any of clauses 16-18, further comprising determining the power headroom and the threshold for truncated channel inversion as a function of pathloss and a number of training samples configured by the parameter server.
21. The method of any of clauses 16-20, further comprising choosing a configured uplink resource for transmitting the amplitude modulated analog signal based on a downlink pathloss.
22. The method any of clauses 16-21, further comprising scaling the transmission power based on a confidence level of a gradient estimate after a last local epoch.
23. An apparatus for federated learning at a user device, comprising:
   a memory storing computer-executable instructions; and
   at least one processor communicatively coupled with the memory and configured to execute the instructions to perform the method of any of clauses 16-22.
24. An apparatus for wireless communication, comprising means for performing the method of any of clauses 16-22.
25. A non-transitory computer-readable medium storing computer executable code, the code when executed by a processor causes the processor to perform the method of any of clauses 16-22.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method for federated learning at a UE, comprising:
   receiving a global model from a parameter server;
   training the global model based on training data to determine a plurality of local epochs;
   performing truncated channel inversion based on a power headroom and a threshold for truncated channel inversion for each of a plurality of values associated with at least a last local epoch of the plurality of local epochs; and
   transmitting an amplitude modulated analog signal to the parameter server for each respective value of the plurality of values, wherein a transmission power of the amplitude modulated analog signal is scaled based on the respective value associated with at least the last local epoch.

2. The method of claim 1, wherein performing truncated channel inversion comprises truncating one or more of the plurality of values associated with at least the last local epoch to meet the power headroom in response to a transmit power after channel inversion exceeding a power headroom.

3. The method of claim 1, further comprising receiving a maximum transmission power and the threshold for truncated channel inversion from the parameter server.

4. The method of claim 1, further comprising determining the power headroom and the threshold for truncated channel inversion based on a tradeoff between transmit power penalty and value accuracy.

5. The method of claim 1, further comprising determining the power headroom and the threshold for truncated channel inversion as a function of pathloss and a number of training samples configured by the parameter server.

6. The method of claim 1, further comprising choosing a configured uplink resource for transmitting the amplitude modulated analog signal based on a downlink pathloss.

7. The method of claim 1, further comprising scaling the transmission power based on a confidence level of a gradient estimate after a last local epoch.

8. An apparatus for federated learning at a user equipment (UE), comprising:
   a memory storing computer-executable instructions; and
   at least one processor communicatively coupled with the memory and configured to execute the instructions to:
      receive a global model from a parameter server;
      train the global model based on training data to determine a plurality of local epochs;
      perform truncated channel inversion based on a power headroom and a threshold for truncated channel inversion for each of a plurality of values associated with a least a last local epoch of the plurality of local epochs; and
      transmit an amplitude modulated analog signal to the parameter server for each respective value of the plurality of values, wherein a transmission power of the amplitude modulated analog signal is scaled based on the respective value associated with at least the last local epoch.

9. The apparatus of claim 8, wherein the at least one processor is configured to truncate one or more of the plurality of values associated with at least the last local epoch to meet the power headroom in response to a transmit power after channel inversion exceeding a power headroom.

10. The apparatus of claim 8, wherein the at least one processor is configured to receive a maximum transmission power and the threshold for truncated channel inversion from the parameter server.

11. The apparatus of claim 8, wherein the at least one processor is configured to determine the power headroom and the threshold for truncated channel inversion based on a tradeoff between transmit power penalty and value accuracy.

12. The apparatus of claim 8, wherein the at least one processor is configured to choose a configured uplink resource for transmitting the amplitude modulated analog signal based on a downlink pathloss.

13. The apparatus of claim 8, wherein the at least one processor is configured to determine the power headroom and the threshold for truncated channel inversion based on a function of pathloss and a number of training samples configured by the parameter server.

14. The apparatus of claim 8, wherein the at least one processor is configured to scale the transmission power based on a confidence level of a gradient estimate after a last local epoch.

15. An apparatus for federated learning at a user equipment (UE), comprising:
   means for receiving a global model from a parameter server;
   means for training the global model based on training data to determine a plurality of local epochs;

means for performing truncated channel inversion based on a power headroom and a threshold for truncated channel inversion for each of a plurality of values associated with at least a last local epoch of the plurality of local epochs; and means for transmitting an amplitude modulated analog signal to the parameter server for each respective value of the plurality of values, wherein a transmission power of the amplitude modulated analog signal is scaled based on the respective value associated with at least the last local epoch.

16. The apparatus of claim 15, wherein the means for performing truncated channel inversion is configured to truncate one or more of the plurality of values associated with at least the last local epoch to meet the power headroom in response to a transmit power after channel inversion exceeding a power headroom.

17. The apparatus of claim 15, further comprising means for receiving a maximum transmission power and the threshold for truncated channel inversion from the parameter server.

18. The apparatus of claim 15, further comprising means for determining the power headroom and the threshold for truncated channel inversion based on a tradeoff between transmit power penalty and value accuracy.

19. The apparatus of claim 15, further comprising means for determining the power headroom and the threshold for truncated channel inversion as a function of pathloss and a number of training samples configured by the parameter server.

20. The apparatus of claim 15, further comprising means for choosing a configured uplink resource for transmitting the amplitude modulated analog signal based on a downlink pathloss.

21. The apparatus of claim 15, further comprising means for scaling the transmission power based on a confidence level of a gradient estimate after a last local epoch.

22. A non-transitory computer-readable medium storing computer executable code, the code when executed by a processor causes the processor to:
receive a global model from a parameter server;
train the global model based on training data to determine a plurality of local epochs;
perform truncated channel inversion based on a power headroom and a threshold for truncated channel inversion for each of a plurality of values associated with at least a last local epoch of the plurality of local epochs; and
transmit an amplitude modulated analog signal to the parameter server for each respective value of the plurality of values, Wherein a transmission power of the amplitude modulated analog signal is scaled based on the respective value associated with at least the last local epoch.

23. The non transitory computer-readable medium of claim 22, wherein the code when executed by a processor causes the processor to truncate one or more of the plurality of values associated with at least the last local epoch to meet the power headroom in response to a transmit power after channel inversion exceeding a power headroom.

24. The non-transitory computer-readable medium of claim 22, wherein the code when executed by a processor causes the processor to receive a maximum transmission power and the threshold for truncated channel inversion from the parameter server.

25. The non-transitory computer-readable medium of claim 22, wherein the code when executed by a processor causes the processor to determine the power headroom and the threshold for truncated channel inversion based on a tradeoff between transmit power penalty and value accuracy.

26. The non-transitory computer-readable medium of claim 22, wherein the code when executed by a processor causes the processor to choose a configured uplink resource for transmitting the amplitude modulated analog signal based on a downlink pathloss.

27. The non-transitory computer-readable medium of claim 22, wherein the code when executed by a processor causes the processor to determine the power headroom and the threshold for truncated channel inversion based on a function of pathless and a number of training samples configured by the parameter server.

28. The non-transitory computer-readable medium of claim 22, wherein the code when executed by a processor causes the processor to scale the transmission power based on a confidence level of a gradient estimate after a last local epoch.

* * * * *